United States Patent [19]

Souto et al.

[11] Patent Number: 4,927,861
[45] Date of Patent: May 22, 1990

[54] RIGID POLYURETHANE PREPARATION PROCESS

[75] Inventors: Sadario O. Souto, Sao Caetano do Sul; Wilson G. De Moura, Sao Paulo, both of Brazil

[73] Assignee: Brastemp S/A, Sao Bernardo Do Campo, Brazil

[21] Appl. No.: 309,916

[22] Filed: Feb. 10, 1989

Related U.S. Application Data

[63] Continuation of Ser. No. 164,927, Mar. 7, 1988, abandoned.

[30] Foreign Application Priority Data

Mar. 11, 1987 [BR] Brazil ................................ 8701098

[51] Int. Cl.$^5$ ............................................ C08G 18/14
[52] U.S. Cl. ..................................... 521/99; 521/107; 521/108; 521/110; 521/127; 521/129; 521/131; 521/175
[58] Field of Search .................. 521/99, 107, 108, 110, 521/127, 129, 131, 175

[56] References Cited

U.S. PATENT DOCUMENTS 3,153,002 10/1964 Wismer et al. ...................... 521/175
4,111,828 9/1978 Wang ................................... 521/175

FOREIGN PATENT DOCUMENTS

| 037010 | 10/1981 | European Pat. Off. . |
| 061201 | 9/1982 | European Pat. Off. . |
| 091828 | 10/1983 | European Pat. Off. . |
| 104736 | 4/1984 | European Pat. Off. . |
| 112628 | 7/1984 | European Pat. Off. . |
| 113172 | 7/1984 | European Pat. Off. . |
| 113507 | 7/1984 | European Pat. Off. . |
| 184688 | 3/1985 | European Pat. Off. . |
| 137489 | 4/1985 | European Pat. Off. . |
| 151401 | 8/1985 | European Pat. Off. . |
| 152915 | 8/1985 | European Pat. Off. . |
| 154079 | 9/1985 | European Pat. Off. . |
| WO8601522 | 3/1986 | PCT Int'l Appl. . |
| 891776 | 3/1962 | United Kingdom . |
| 982280 | 2/1965 | United Kingdom . |
| 986521 | 3/1965 | United Kingdom . |
| 1008121 | 10/1966 | United Kingdom . |
| 1065590 | 4/1967 | United Kingdom . |
| 1097407 | 1/1968 | United Kingdom . |
| 1104733 | 2/1968 | United Kingdom . |
| 1154161 | 6/1969 | United Kingdom . |
| 1156340 | 6/1969 | United Kingdom . |
| 1279894 | 6/1972 | United Kingdom . |
| 1369806 | 10/1974 | United Kingdom . |
| 1504432 | 3/1978 | United Kingdom . |

*Primary Examiner*—Maurice J. Welsh
*Attorney, Agent, or Firm*—Darby & Darby

[57] ABSTRACT

The present invention relates to the obtention of a rigid polyurethane compound, cellular or micro-cellular, reinforced or not, having a density ranging from 0.20 to 1.30 g/cm$^3$; the formation of this compound happens through the mixing of a resin composed of a mixture of polyether and polyester polyols aminated or not, having a molecular weight ranging from 100 to 5000, employed at 5 to 100 parts by weight; surfactant based on dimethylpolysiloxane, employed at 0.1 to 5 parts by weight; amine catalysts of the tetramethylethylenediamine and dimethylcyclohexylamine type employed at 0.1 to 6 parts by weight; fluorinated blowing agents, such as trichloromonofluoromethane, used at 0 to 50 parts by weight; a reinforcing agent such as milled, hammered fiberglass, rice husks, coffee husks or corn husks and polypropylene strands or mineral charges, used at 0 to 50 parts by weight; and a flame retarding agent such as diethyl N,N bis (2-hydroxyethyl) aminoethyl phosphonate of tri (B-chloro-isopropyl)phosphate, used at 5 to 30 parts by weight. An aromatic poly-isocyanate, which can be toluene diisocyanate (TDI) or diphenylmethane diisocyanate (MDI) employed at 90 to 150 parts by weight, is mixed with the resin in an appropriate machine and, when the mixture is injected in a mold having the shape of the part, that mixture acquires exactly the shape thereof, being finished in a few minutes. The utilization of this patent of invention is to replace steel in home appliances such as: panels, parts and doors of refrigerators and freezers, panels and parts of laundering machines, dish washers, clothes driers and microwave ovens.

9 Claims, 3 Drawing Sheets

RIGID POLYURETHANE PREPARATION PROCESS

This is a continuation of application Ser. No. 164,927, filed Mar. 7, 1988, now abandoned.

The present invention relates to a process for the preparation of rigid polyurethane, reinforced or not, appropriate to replace sheets and other steel parts in home appliances such as refrigerators, freezers, laundering machines, dishwashers, clothes driers and microwave ovens. The methods currently known for the manufacture of home appliances of the so-called white line present some drawbacks related to the use of steel panels and other structural parts. In these conventional techniques, the use of steel parts, particularly plates, limits the shape variations of the assembly, requires various manufacture operations to reach the final preparation for assembly of the home appliance and the use of internal filling of the panels with an insulating material in the cases of refrigerators and freezers, and requires special treatments to minimize the effects of corrosion, which is never entirely eliminated.

In view of the drawbacks of the state of the art for the manufacture of those home appliances, the development of a new product in polyurethane was proceeded with for the of panels and other parts of those devices, replacement of metallic parts by polyurethane parts automotive vehicle components such as bumpers and other fields is already well-known. However, many of known polyurethane products that replace metallic assume for form of elastomers having an elongation greater than 100%, considering the ASTM D-638 standard of 1977 for the elongation test method. Also, these polyurethane action between a composition possessing NCO radicals (aromatic poly-isocyanates) in the presence of catalysts and other property-adjusting additives, display elastomeric characteristics that render them inappropriate for the replacement of rigid metallic elements of the above defined white-line home appliances.

Examples of these elastomeric polyurethanes employed in the so-called RIM (Reaction Injection Molding) processes can be found on U.S. Pat. Nos. 4,243,760, 4,444,910 and 4,540,768 which describe the reaction of a polyol (polyether, aminated polyester or polymer) having a high molecular weight, a poly-isocyanate (aromatic or otherwise) and a chain extender (aromatic diamine or amine-terminated). Other currently known polyurethane products assume the form of rigid, non-elastomeric polyurethanes also resulting basically from the reaction of a polyol with a poly-isocyanate in the presence of catalysts, chain extenders and other additives. Even though they are a rigid product, these polyurethanes are non-cellular, leading to the objection of products having a high and undesirable hardness and a low thermal insulation capacity, which render them unsuitable for the construction of panels for said home appliances and also, in terms of thermal insulation characteristics, they are deficient in the construction of panels for refrigerators and freezers.

The document BR No. 188,162/67 describes certain polyurethane material of the above mentioned type that includes the addition of a small quantity of uncured epoxy resin to a composition containing polyurethane resin, in order to increase the resistance to deformation by heat and color stability of the rigid, non-elastomeric and non-cellular polyurethane products.

Still other known polyurethane products are prepared by the reaction of three polyols with poly-isocyanates, and a polyurethane of this type is described on the patent document BR No. 7904252, having a ratio of bending modulus $-29°$ C./$70°$ C. no higher than $-3.4$ and with one of the three polyols having a reactivity towards the poly-isocyanate higher than the reactivity of either of the two other polyols (active hydrogen compositions). Also in this case, the polyurethane products obtained have characteristics that render them unsuitable for the replacement of plate panels in white-line home appliances, as they necessarily employ three polyols and have a ratio of flexural modulus which, notwisthstanding its being within the range of the present invention, is related to very low test values to allow the utilization thereof in home appliances.

The present invention relates to a process for the preparation of a rigid, thermo-stable, cellular or micro-cellular polyurethane, reinforced or otherwise, with an elongation lower than 100%, preferably between 2 and 50%, having a density ranging between 0.20 to 1.30 $g/cm^3$, preferably about 0.60 $g/cm^3$, the rigid polyurethane product being obtained by the mixing and reaction of: a resin defined by at least one polyether polyol and/or a polyester polyol selected among the aminated and non-aminated ones, derived from sucrose and propylene oxide, having a molecular weight ranging from 100 to 5,000, hydroxil numbers between 30 and 500 and viscosity from 100 to 10,000 centipoise and in a quantity of 5 to 100 parts by weight of resin; and an aromatic poly-isocyanate selected from the group defined by toluene diisocyanate (TDI) and diphenylmethane diisocyanate (MDI) having a viscosity from 8 to 1000 centipoise, with a NCO percentage of 30 to 40 and in quantities from 90 to 150 parts by weight, the mixture ratio between the two isocyanate (NCO) and resin (OH) NCO/OH components ranging from 0.60 to 2.20.

The invention also relates to the product obtained by the above-mentioned reaction.

In addition to the basic compositions mentioned above (polyols and poly-isocyanates), the product in question may include, as reaction components, cell-size adjusting agents, chain extension agents, expansion agents, reinforcement agents and flame-retarding agents.

The rigid polyurethane product obtained from the reactions mentioned above is particularly useful for the replacement of steel sheets in home appliances, particularly those of the so-called white-line, as they present the following advantages:

the polyurethane composition can be injected and acquires the shape of the mold, thereby providing a greater design versatility;

it possesses a quick processing cycle, thereby increasing productivity;

it is an insulating material, being recommended for systems requiring energy and food conservation, such as refrigerators and freezers;

it is a corrosion-resistant material, thereby solving the problems of replacing parts worn by oxidation or corrosion caused by chemical products;

it is amenable to painting by conventional processes, facilitating the utilization thereof for aesthetic purposes;

it allows decorative applications in the most varied shapes and processes, such as hot-stamping adhesives, silk-screen, etc.;

it possesses mechanical strength at low and high temperatures.

The composition for obtention of the rigid polyurethane polymer having physical-chemical properties suitable for the replacement of steel in home appliances is directly related to the selection of the raw materials and the amount thereof employed.

The raw material employed in the production of the resin basically includes:

(a) A mixture of polyether polyols and polyesters - aminated or not, derived from sucrose and prolylene oxide, having a molecular weight ranging from 100 to 3000, hydroxyl number from 30 to 450 and a viscosity in centipoise of 100 to 10,000; the amount employed ranges from 5 to 100 parts by weight of the resin. The polyether polyols are prepared by the reaction of an alkylene oxide and those derived therein from, with compositions containing active hydrogen as promoter. The most widely employed alkylene oxides are, for example, the ethylene oxide and the propylene oxide. The promoters of choice include ethylene glycol, propylene glycol, butanodiol, glycerin, trimethylolpropane, pentaerythritol, sorbitol, sucrose and mixtures thereof. Other promoters for aminated polyols are: ammonia, ethylenediamine, diethylenotriamine, toluenodiamine, diamino-diphenylmethane, triethylenotetramine, ethanolamine and mixtures thereof.

As an example of processes for the obtention of polyether polyols we can mention—U.S. Pat. Nos. 2,948,757 and 3,000,963.

Polyester polyols result from the reaction of a carboxylic acid or anhydride with a polyhydric alcohol. The most common acids are the adipic acid, phtallic acid, and phtallic anhydride; the alcohols are ethylene glycol, propylene glycol, dipropylene glycol, trimethylpropane, mannitol, sucrose and mixtures thereof. In addition to the above mentioned mixture, the resin may also contain:

(b) an agent to adjust the size of cells formed, also known as agent responsible for the breaking of surface tension or surfactant agent, which is a silicone derived from polydimethylsiloxane, employed as 0.1 to 5 parts by weight of the resin. The U.S. Pat. No. 3,194,773 describes agents of this type.

(c) a chain extender agent which can be a diol, triol or amines, such as glycerin, diethylene glycol, 1-4 butanediol, ethylene glycol, propylene glycol, diethylene diamine, 2,4 diaminotoluene, 1,3 phenylenediamine, 1-4 phenylene diamine and mixtures thereof, employed in 0 to 30 parts by weight of the resin.

(d) As expansion agents, responsible for the growth and low thermal conductivity coefficient (k-factor) of the polymer formed, which is a trichloromonofluoromethane used as 0 to 50 parts by weight of the resin.

(e) A catalyst based on tertiary ammines and/or tin, responsible for the directing and speed of the reaction and the curing time, which are: 1,3 diaminopropane, ethanolamine, diethylenodiamine, tetramethylenodiamine, diaminocyclohexane, hexamethylenodiamine, triethylenotetramine, dimethylcyclopolyols tetraethylenopentamine, tin octotate, tin oleate, tin dibutyldilaurate, tin dibutyldioctoate and mixtures thereof, employed as 0.1 to 8 parts by weight of the resin.

(f) A reinforcing agent, which is responsible for the structural part of the polymer formed: milled or hammered glass fiber is employed, as well as rice husks, coffee husks, corn husks and polypropylene strands, mineral charges such as calcium carbonate, talc, cica, glass micro spheres, etc., employed from 0 to 50 parts by weight of the resin.

(g) A flame retarding agent, which is the diethyl N,N (2-hydroxyethyl)aminoethylphosphate and tri (β-chloro-isopropyl) phosphate, employed from 5 to 30 parts by weight of the resin. The resin formed from the above defined elements is mixed in a stoichiometric manner with an aromatic poly-isocyanate responsible for providing the NCO groups which, by reacting with the other components, forms the polyurethane. The most employed raw materials are the toluene-diisocyanate (TDI), the diphenylmethane-diisocyanate (MDI) and a pre polymer of TDI or MDI, having a viscosity ranging from 8 to 1,000 and a NCO percentage of 30 to 40, employed from 90 to 150 parts by weight.

There are various methods for the preparation of isocyanates, but the commercially employed one is the phosgenation of primary amines. The main route for obtention of the TDI is from toluene which, through nitration, allows the obtention of a mixture of mononitrotoluene isomers; after a new nitration, the 2,4 dinitrotoluene (80%) and the 2,6 dinitrotoluene (20%) are obtained; after a reduction and phosgenation, one arrives at the toluene diisocyanate 80/20, a mixture of isomers which is commercially called TDI.

Figure 1:
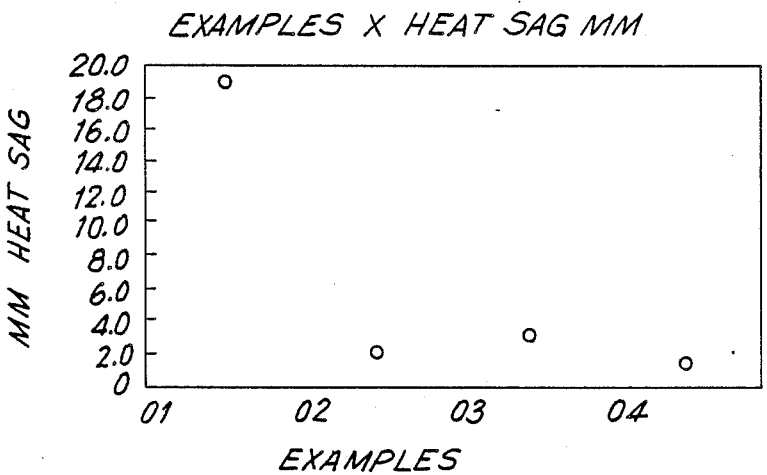
FIGS. 1–7 show the variation of properties in Examples 1–4.
Figure 2:
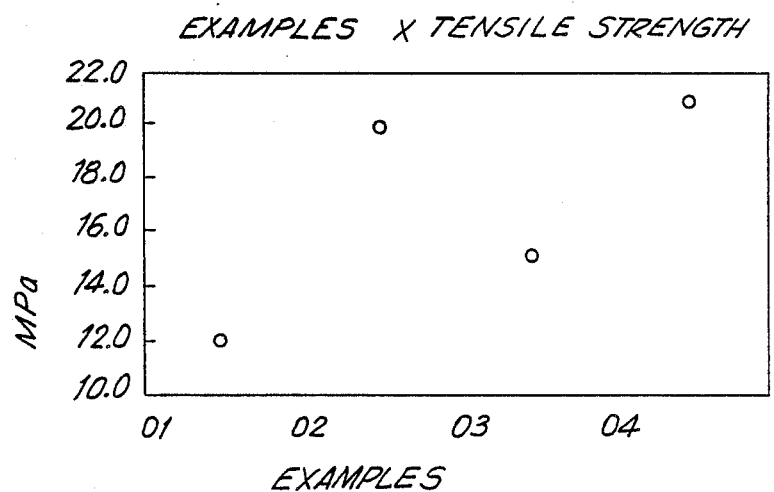
Figure 3:
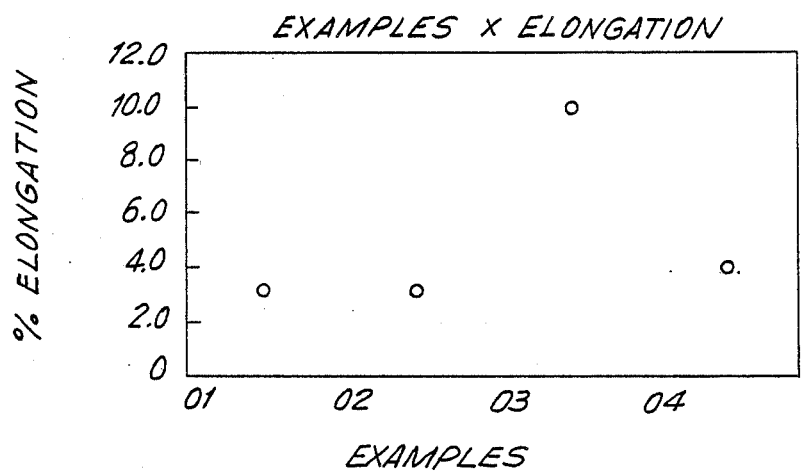
Figure 4:
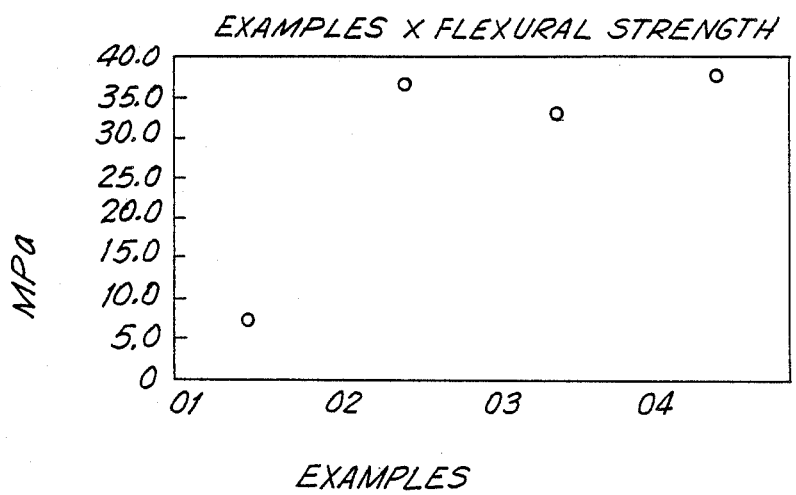
Figure 5:
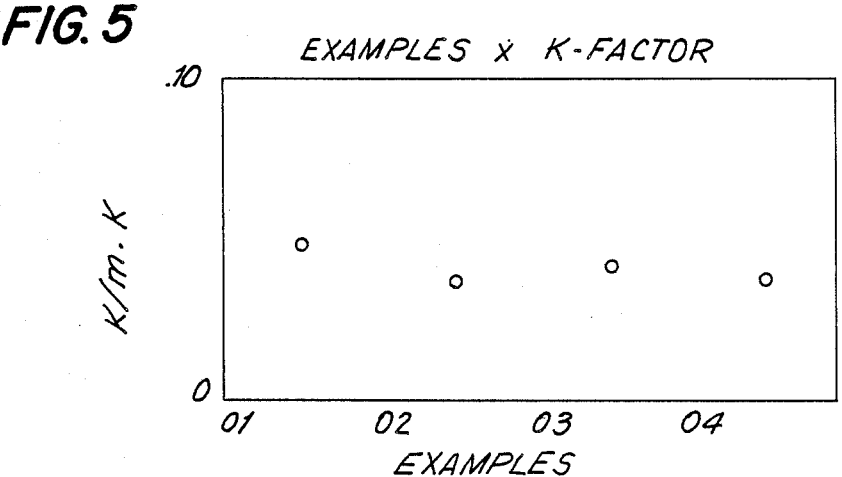
Figure 6:
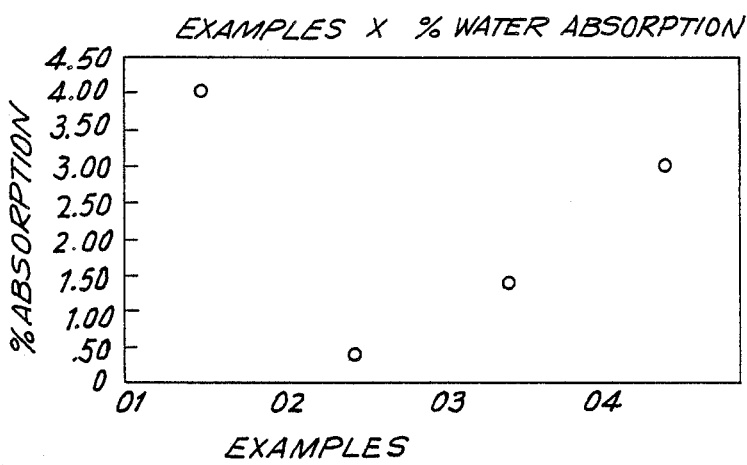

The route for obtention of MDI is from aniline and formaldehyde; after a condensation and subsequent phosgenation, one obtains the diphenylmethane 4,4 diisocyanate, commercially known as MDI.

The mixture of raw materials from item "a" up to item "g" in defined proportions is given the name of resin. The rigid polyurethane composition is the result of the chemical reaction between the resin and the isocyanate, this being performed by an appropriate injection machine, that makes the mixture of the two components.

The process for obtention of rigid polyurethane parts and panels, reinforced or not, having a density ranging from 0.20 to 1.30 g/cm$^3$, is done by injecting this mixture in an appropriate mold able to resist the growth pressure In a few seconds the mixture acquires the mold shape and in 1 to 10 minutes the part is finished and can be removed from the mold. As with other polymeric material, the properties of polyurethane polymers are related to the molecular weight, the inter-molecular forces, the stiffness, segments of the polymer chain, crystallinity and the degree of cross linkings. The strength tests have shown that, by increasing the items mentioned above, there is a non directly proportional increase in the properties of the polyurethane polymers. In the case of the instant invention this is exactly what happens; the selection of the raw material responsible for these items is fundamental to obtain a product having the properties of thermal insulation, resistance to impacts, mechanical strength and corrosion resistance to replace steel in home appliances. We describe below some examples of the compositions of raw material and the properties thereof, which should not be deemed as limiting the invention

EXAMPLE 1

In the preparation of the resin, the following raw materials were mixed: 40 parts by weight of a polyether polyol MW 450 and hydroxyl number 410, 5 parts by weight of a polyether polyol MW 1,000 and hydroxyl number 110, 30 parts by weight of a polyether polyol MW 4,700 and hydroxyl number 34, 60 parts of a polyester polyol MW 280 and hydroxyl number 430, 2 parts by weight of a surfactant derived from dimethylpolysiloxane MW 5,000 and hydroxyl number 115, 2.5 parts by weight of an amine catalyst dimethylcyclohexylamine, 20 parts by weight of trichloromonofluoromethane. This mixture was mixed with 98.8 parts by weight of toluene diisocyanate in an appropriate blender at a controlled speed, the mixture being injected in a rectangular-shape mold. After curing, samples were extracted to perform the Tests listed on Table 2.

EXAMPLE 2

In the preparation of the resin, 50 parts by weight of a polyether polyol MW 450 and hydroxyl number 410; 50 parts by weight of an aminated polyether polyol MW 480 and hydroxyl number 470; 2.5 parts by weight of a dimethylpolysiloxane surfactant, MW 5,000; 2 parts by weight of tetramethylenediamine catalyst and 10 parts by weight of trichloromonofluoromethane were mixed. This resin was mixed with 110 parts by weight of diphenylmethane diisocyanate in an appropriate blender at a controlled speed, the mixture being then injected in a rectangular-shaped mold. Test samples were removed after curing, to perform the tests listed on Table 2.

EXAMPLE 3

For preparation of the resin, 80 parts by weight of a polyether polyol MW 450 and hydroxyl number 410; 20 parts by weight of a polyester polyol MW 280 and hydroxyl number 430; 2.5 parts by weight of dimethylsiloxane MW 5,000 dissolved in dipropyleneglycol with hydroxyl number 115, 3.0 parts by weight of tetramethylethylenediamine and 10 parts by weight of trichloromonofluoromethane were mixed. This resin was mixed with 120 parts by weight of diphenyl methane diisocyanate in an appropriate blender at a controlled speed, the mixture being injected in a rectangular-shape mold. Samples were extracted after curing, to perform the tests listed on Table 2.

EXAMPLE 4

For preparation of the resin, 80 parts by weight of a poly. ether polyol MW 450 and hydroxyl number 410; 20 parts by weight of a polyesther polyol MW 280 and hydroxyl number 430; 3.0 parts by weight of dimethylpolysiloxane; 3.0 parts by weight of tetramethylethylenediamine; 10 parts of trichloromonofluoromethane and 5 parts by weight of 3.1 mm long milled fiberglass were mixed.

This resin was mixed with 120 parts by weight of toluene diisocyanate in an appropriate blender at a controlled speed, the mixture being injected in a rectangular-shaped mold. Samples were taken after curing to perform the tests listed on Table 2.

| Characteristics of the Raw Material | | | |
|---|---|---|---|
| Product | Viscosity cp | OH Nr. | MW |
| Polyol I | 8,000 | 410 | 450 |
| Polyol II | 175 | 110 | 1,000 |
| Polyol III | 1,000 | 34 | 4,700 |
| Polyol IV | 5,000 | 470 | 480 |
| Polyol V | 10,000 | 430 | 280 |
| Dimethylpolysiloxane | 434 | 115 | 5,000 |
| Tetramethylethylenediamine | 4 | — | 116 |
| Dimethyldichlorohexylamine | 3 | — | 127 |
| Trichloromonofluoromethane | — | — | 137,4 |
| Toluene diisocyanate | 10 | — | 182,2 |
| Diphenylmethane diisocyanate | 120–800 | — | 242 |

| Products | % NCO Density g/cm$^3$ | Refr. Index |
|---|---|---|
| Polyol I | 1.080 | 1.467 |
| Polyol II | 1.008 | 1.451 |
| Polyol III | 1.018 | 1.456 |
| Polyol IV | 1.110 | 1.478 |
| Polyol V | 1.236 | 1.587 |
| Dimethylpolysiloxane | 1.052 | 1.454 |
| Tetramethylethylenediamine | 0.770 | — |
| Dimethylcyclohexylamine | 0.850 | — |
| Trichloromonofluoromethane | — | — |
| Toluene diisocyanate | 1.25 | — |
| Diphenylmethane diisocyanate | 1.23 | — |

Note: The Polyols I, II, III are polyethers derived from sucrose and propylene oxide.
The Polyol IV is an aminated polyether derived from sucrose and propylene oxide polymerized with a tertiary amine.
The Polyol V is a polyester derived from the residue of dimethyltherephtalate and dipropyleneglycol.

TABLE 2
(Properties)

| Item | Examples 1 | 2 | 3 | 4 |
|---|---|---|---|---|
| Density, g/cm$^3$ | 0.40 | 0.60 | 0.60 | 0.60 |
| Cream time, sec. | 13 | 18 | 16 | 19 |
| Gel time, sec. | 36 | 40 | 33 | 33 |
| Take free, sec. | 60 | 55 | 49 | 65 |
| Stirring time, sec. | 4 | 6 | 6 | 10 |
| Mold temperature, °C. | 25 | 25 | 25 | 25 |
| Demolding, min. | 20 | 10 | 10 | 20 |
| Heat sag at 50° C., mm | 19 | 2 | 3 | 1.5 |
| Heat sag at 70° C., mm | 30 | 10 | 5 | 2 |
| Tensile strength, MPa | 12 | 20 | 15 | 21 |
| Elongation, % | 3 | 3 | 10 | 4 |
| Flexural strength, MPa | 0.7 | 36.5 | 32.8 | 37.5 |
| K. Factor - (W(M.K.) | 0.048 | 0.038 | 0.041 | 0.042 |
| Water absorption, % | 4 | 0.7 | 1.4 | 3 |
| Shore A hardness | 80 | 100 | 100 | 100 |
| Rockwell R hardness | 110 | 100 | 63 | 53 |
| Corrosion resistance | * | * | * | * |
| Impact resistance Izod j/m | 0.3 | 13.7 | 20.8 | 21.4 |

*non-corroding.

THE POLYOL EFFECT

The reaction of the hydroxyl groups of polyols with isocyanate is a typical example of formation of polyurethane; the different hydroxyl numbers and molecular weights provide different properties to the group formed.

In the case of rigid polymers, as in this invention, the graphs illustrated on FIGS. 1, 2, 4, 5 of the drawings appended show an improvement in the strength of the product by decreasing the high molecular weight polyols and increasing the low molecular weight polyols. In general, the low molecular weight and high hydroxyl number polyols are used for cellular or micro-cellular rigid polymers, whereas high molecular weight and lower hydroxyl number polyols are used for flexible polymers and elastomers, etc. The combination of these polymers provides intermediate properties to the polymer formed.

THE SURFACTANT EFFECT

The surfactant or cell stabilizer is a wet agent, responsible for the uniform size of the cells formed. A low surfactant level provides large, non-uniform cells, whereas an appropriate level produces small and uniform cells. In the case of the properties, the effect is diluted due to the influence of the other compositions but, microscopically, this effect can be observed and measured, that is, the cell size can range from 2 to 200 microns.

THE CATALYST EFFECT

Figure 7:
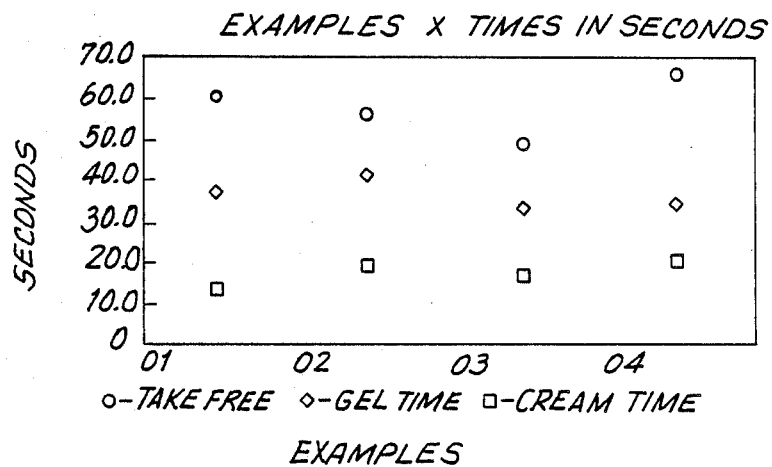

As shown on FIG. 7, an increase in the catalyst level decreases the cream, gel and free adhesion time when we consider similar systems, as in systems having various polyols this occurs but not in a proportional manner. The amine and tin-based catalysts serve to direct the reaction between the isocyanate and the hydroxyl compounds in a quick manner to prevent cell collapse and so that the polymer can cure in a pre-established manner.

THE BLOWING AGENT EFFECT

The most employed agent for rigid polymers is the trichloromonofluoromethane (R-11) which, due to its properties and encapsulation thereof in the cells, provides much improved insulating properties (low K factor) to the polymer, in addition to being a physical agent that decreases the resin viscosity, facilitating the processing. The decrease of R-11 concentration increases the polymer's density, improves the mechanical properties (see FIGS. 1, 2, 4). The thermal insulation is a function not only of the amount of R-11, but also of the other raw material and the effect thereof is not directly proportional to R-11 (see FIG. 5).

THE ISOCYANATE EFFECT

The reaction of isocyanate compounds with hydroxyl containing compounds produces the urethane polymer, in the case of rigid polyurethanes, the selection of raw materials should be directed towards the formation of crosslinks that provide mechanical strength to the polymer formed. In the examples cited we can observe that the best properties are obtained in those employing MDI; this is explained by the fact that it has a molecule more appropriate for the formation of crosslinks than the TDI.

THE FILLERS EFFECT

The function of the fillers is increasing the filling and provide a better mechanical strength to the polymer (see FIGS. 1, 2, 3 and 4); we can mention example 4, which had its mechanical properties considerably improved with the introduction of fiberglass.

Based on the effects of each raw material on the final polymer and the their respective properties, we can relate each example and its respective application; the examples of 1 to 3 are employed in the manufacture of panels and parts for refrigerators and freezers, due to their insulating properties and corrosion-resistance; example 4 is employed in the manufacture of panels and parts for laundering machines, dish-washers, clothes driers and microwave ovens, due to their tensile strength, structural effect, impact resistance and total absence of corrosion.

We claim:

1. Process for the preparation of rigid, cellular, high density polyurethane, comprising:

reacting a resin including at least one polyether polyol and at least one polyester polyol in an amount of 5 to 100 parts by weight of resin, said polyether polyol derived from sucrose and propylene oxide, each of said polyols having a molecular weight of between 100 and 5,000, a hydroxyl number of between 30 and 500 and a viscosity of between 100 and 10,000 centipoise, with 90 to 150 parts by weight of resin of an aromatic polyisocyanate selected from the group consisting of toluene diisocyanate and diphenylmethane diisocyanate, said aromatic polyisocyanate having a viscosity of between 8 and 1000 centipoise and having an NCO percentage of 30 to 40, said rigid polyurethane having an elongation of between 2 and 50%, a density of between 0.20 to 1.30 g/cm3 and an NCO/OH ratio of between 0.60 and 2.20.

2. The process of claim 1, wherein said polyester polyol is derived from residues of dimethylterephtalate and dipropyleneglycol.

3. The process of claim 1, wherein said resin includes from 0.1 to 5 parts by weight of a cell size adjusting surfactant agent, defined by a silicone derived from a polydimethylsiloxane.

4. The process of claim 1, wherein said resin includes from 0 to 30 parts by weight of a chain extender agent selected from the group consisting of diols and triols.

5. The process of claim 4, wherein said chain extender agent is selected from the group consisting of glycerin, diethyleneglycol and 1-4 butanediol.

6. The process of claim 1, wherein said resin includes from 0 to 30 parts by weight of an expansion agent including trichloromonofluoromethane.

7. The process of claim 1, wherein said resin includes from 0.1 to 8 parts by weight of a catalyst selected from the group consisting of tetra-methylethylenediamine, dimethylcyclohexylamine, tin butyldilaurate and tin octane.

8. The process of claim 1, wherein said resin includes from 0 to 50 parts by weight of a reinforcing agent selected from the group consisting of milled or hammered fiberglass roving, rice husks, corn husks, coffee husks, polypropylene strands and mineral charges.

9. The process of claim 1, wherein said resin includes from 5 to 30 parts by weight of a flame retarding agent selected from the group consisting of diethyl N,N-bis (2-hydroxyethyl) amino-ethylphosphonate and tri (B-chloroisopropyl) phosphate.

* * * * *